३,४४९,३६६
PROCESS FOR THE PREPARATION OF 2-AMINO-
4,5-SUBSTITUTED - 1,3 - DITHIOLES AND THE
ACID ADDITION SALTS THEREOF
Thomas Andrew Lies, Montgomery Township, Somerset
County, N.J., assignor to American Cyanamid Company, Stamford, Conn., a corporation of Maine
No Drawing. Filed June 5, 1967, Ser. No. 643,408
Int. Cl. C07c *153/07;* C07d *71/00;* A01n *9/12*
U.S. Cl. 260—327                                    8 Claims

ABSTRACT OF THE DISCLOSURE

The present invention relates to a method for effecting the cyclization of substituted 2-propynyl dithiocarbamates to obtain ring-substituted iminodithioles, as well as their acid addition salts. More particularly, the invention relates to the cyclization of a substituted 2-propynyl dithiocarbamate represented by the structure:

(I)
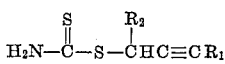

wherein $R_1$ is hydrogen or lower alkyl, and $R_2$ stands for hydrogen, lower alkyl, phenyl or aryl utilizing a non-oxidizing strong acid to recover a ring-substituted iminodithiole or its salt represented by the structure:

(II)
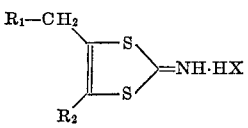

wherein $R_1$ and $R_2$ are the same as defined hereinabove and HX is a non-oxidizing strong acid, such as hydrochloric acid or sulfuric acid.

Still more particularly, the invention is concerned with the cyclization of a substituted 2-propynyl dithiocarbamate of the structure:

(I)
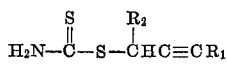

wherein $R_1$ is hydrogen or lower alkyl and $R_2$ is hydrogen, lower alkyl, phenyl or aryl with at least equimolar amounts of a non-oxidizing strong acid at a temperature from about 20° C. to about 50° C. to form an iminodithiolane of the structure:

(Ia)
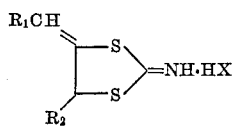

wherein $R_1$ and $R_2$ are as defined above and HX is a strong acid, such as hydrochloric acid or sulfuric acid, and further isomerizing the latter iminodithiolane salt by treating said salt with at least an equimolar amount of a non-oxidizing strong acid at a temperature of from about 80° C. to 100° C. to obtain a ring-substituted iminodithiole salt represented by the structure:

(II)
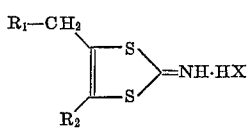

wherein $R_1$, and $R_2$ and HX are as defined above.

The iminodithioles prepared by the process of the invention find utility as intermediates in the preparation of certain insecticides or nematocides. For instance, the compounds can be phosphorylated with reagents of the formula:

wherein A and B are each lower alkyl, lower alkoxy, lower alkylthio, aryl or the radical: $R_3R_4N-$, in which $R_3$ and $R_4$ are each hydrogen or lower alkyl, Z is either oxygen or sulfur and X is a halogen, to produce compounds of the formula:

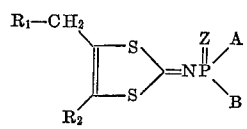

wherein $R_1$ and $R_2$ are the same as defined above, A, B and Z have the same meaning as above defined. These compounds are generically set forth in U.S. Patent No. 3,197,481, issued to R. W. Addor on July 27, 1965, which is incorporated herein by reference.

In general, the substituted 2-propynyl dithiocarbamate reactant can be reaily prepared by reacting the appropriately-substituted 2-propynyl halide compound with ammonium dithiocarbamate. The propynyl halides per se similarly can be prepared inexpensively and with relative ease. Typical techniques for preparing these latter propynyl compounds are disclosed by R. A. Raphael, Acetylenic Compounds in Organic Synthesis, Butterworth's Scientific Publications, London (1955), at pages 58 and 59.

Illustrative 2-propynyl dithiocarbamates are: 2-propynyl dithiocarbamate, 1-methyl-2-propynyl dithiocarbamate, 2-hexynyl dithiocarbamate and 1-phenyl-2-propynyl dithiocarbamate.

The 2-propynyl dithiocarbamate reactant can be reacted in two successive operations utilizing at least approximately equimolar quantities of a non-oxidizing acid in each step. For instance, the substituted 2-propynyl dithiocarbamate is reacted with a non-oxidizing strong acid, such as hydrochloric acid or sulfuric acid, or in the alternative with an aqueous-lower alkyl primary alcohol solution of such acid with the relative proportions of water and alcohol such as to effect at least partial solubility of the reactants, in a ratio of 1.0 to 1.5 moles of acid per mole of substituted 2-propynyl dithiocarbamate at a temperature of 20° C. to 50° C. to produce the substituted iminodithiolane or its salt. Resultant substituted iminodithiolane salt described above is next reacted with a non-oxidizing strong acid, sudh as hydrochloric acid or sulfuric acid, or in the alternative with an aqueous-lower alkyl primary alcohol solution of such acid with the relative proportions of water and alcohol, such as to effect solubility of the reactants, in a ratio of from 1.0 to 5.0 moles of said acid per mole of substituted iminodithiolane sale at temperatures of 80° C. to 100° C. for periods of time ranging from 2.5 to 8 hours to produce a ring-substituted iminodithiole salt. Alternatively, the conversion of 2-propynyl dithiocarbamate to the ring-substituted iminodithiole can be carried out directly without isolating the intermediate iminodithiolane derivative by incorporating the total acid requirement at the commencement of the reaction and, gradually, heating the reactants as in the stepwise process between 20° C. and 100° C. to recover desired product.

The examples presented are merely illustrative and are not to be taken as limitative of the invention. Unless otherwise specified, the parts are by weight.

EXAMPLE A

Preparation of 2-propynyl dithiocarbamate 2-propynyl bromide (47.6 parts) is added dropwise to a stirred slurry of ammonium dithiocarbamate (44.0 parts) in methanol (200 parts, by volume) while the reaction temperature is maintained at 5° C.–9° C. by means of a cooling bath. When addition has been completed, the temperature is allowed to rise slowly to 20° C.; and the reaction mixture is poured on cracked ice. Resultant solid precipitate is collected and recrystallized from ether-pentane solution to yield 32.9 parts of 2-propynyl dithiocarbamate, melting point 50° C.–58.5° C. Recrystallization from ether-pentane solution gives the analytical sample, melting point 55° C.–58.5° C.

Analysis.—Calcd. for $C_4H_5NS_2$. Calcd.: C, 36.62; H, 3.84; N, 10.68; S, 48.89. Found: C, 36.24; H, 3.79; N, 10.41; S, 49.00.

EXAMPLE B

Preparation of 1-methyl-2-propynyl dithiocarbamate

Ammonium dithiocarbamate (13.2 parts) and 14.6 parts of 3-bromo-1-butyne (as prepared by the pyridine-catalyzed reaction of 3-butyn-2-ol and phosphorus tribromide) are reacted by following the procedure of Example A, supra. Recrystallization of the crude product is effected from methylene chloride-pentane solutions and yields 1-methyl-2-propynyl dithiocarbamate having a melting point of 63° C.– 73.5° C. Recrystallizations from chloroform-carbon tetrachloride and chloroform solution yield an analytical sample whose melting point is in the range from 68° C.–75° C.

Analysis.—Calcd. for $C_5H_7NS_2$. Calcd.: C, 41.34; H, 4.86; N, 9.64; S, 44.15. Found: C, 41.12; H, 4.65; N, 9.85; S, 44.17.

EXAMPLE C

Preparation of 2-hexynyl dithiocarbamate

The reaction of Example A is followed wherein ammonium dithiocarbamate (22.0 parts) and 1-bromo-2-hexyne (24.0 parts) are reacted at 2° C.–4° C. to yield 24.4 parts (94%) of 2-hexynyl dithiocarbamate, whose melting point is 44.5° C.—46° C.

Two recrysallizations from chloroform-pentane solution yield the analytical sample, melting point 45° C.—47° C.

Analysis.—Calcd. for $C_7H_{11}NS_2$. Calcd.: C, 48.55; H, 6.40; N, 8.09; S, 36.96. Found: C, 48.36; H, 6.22; N, 7.78; S, 37.14.

EXAMPLE D

Preparation of 1-phenyl-2-propynyl dithiocarbamate

The procedure of Example A is followed wherein ammonium dithiocarbamate (22.0 parts) is reacted with 29.2 parts of 1-phenyl-1-bromo-2-propyne (prepared by the pyridine-catalyzed reaction of phenylethynylcarbinol with phosphorus tribromide) to yield 13.4 parts (43%) of 1-phenyl-2-propynyl dithiocarbamate, melting point 70° C.–75° C.

EXAMPLE 1

Preparation of 2-imino-4-methyl-1,3-dithiole hydrochloride

In a suitable reaction flask, 2-propynyl dithiocarbamate (29.4 parts) is swirled with concentrated hydrochloric acid (28 parts by volume). The temperature of the resulting vigorous reaction is maintained at 25° C.–50° C., by intermittent cooling in an ice bath. When no further exotherm is noted, the red-brown reaction solution is poured into acetone. The flask is kept at 1° C. for several days; then the brown solid precipitate is collected and recrystallized from methanol-ether solution to yield 32.5 parts (86.6%) of 2-imino-4-methylene-1,3-dithiolane hydrochloride whose melting point is 119° C.–124° C. The structure of the product is determined by its infrared and nuclear magnetic resonance spectra.

A sample of the compound is recrystallized repeatedly from methanol-ether solution to give the analytical sample, melting point 120° C.–123° C. (prior sintering).

Analysis.—Calcd. for $C_4H_6NS_2Cl$. Calcd.: C, 28.65; H, 3.61; N, 8.35; S, 38.25; Cl, 21.14. Found: C, 28.73; H, 3.53; N, 8.37; S, 38.29; Cl, 21.23.

A solution of resultant 2-imino-4-methylene-1,3-dithiolane hydrochloride (45.0 parts)) in concentrated hydrochloric acid (90 parts, by volume) contained in a suitable flask fitted with reflux condenser and thermometer is heated at 96° C.—98° C. for about three hours.

The cooled reaction solution is poured into 1600 parts of acetone and the mixture is chilled, first to 1° C., and then in Dry Ice. The resultant solid precipitate (37.3 parts) of 2-imino-4-methyl-1,3-dithiole hydrochloride, decomposition range 168.5° C.–173.5° C., is filtered off. The infrared spectrum of the product is essentially identical with that of pure 2-imino-4-methyl-1,3-dithiole hydrochloride, decomposition range 169° C.–174° C. (prior darkening), the structure of which is determined by infrared and nuclear magnetic resonance analysis, and by the analytical results given below.

Analysis.—Calcd. for $C_4H_6NS_2Cl$. Calcd.: C, 28.65; H, 3.61; N, 8.35; S, 38.25; Cl, 21.14. Found: C, 28.64; H, 3.60; N, 8.49; S, 38.18; Cl, 21.33.

EXAMPLE 2

Preparation of 2-imino-4-methyl-1,3-dithiole hydrochloride 2-propynyl dithiocarbamate (1 mole) is stirred with concentrated hydrochloric acid (5 moles). The temperature of the resulting vigorous reaction is maintained at 20° C.–50° C. until the reaction exotherm is over. Resultant reaction solution is next heated at 80° C.–100° C. for four hours. The product, 2-imino-4-methyl-1,3-dithiole hydrochloride, is isolated in the same manner as described in Example 1 above.

EXAMPLE 3

Preparation of 2-imino-4,5-dimethyl-1,3-dithiole hydrochloride 1-methyl-2-propynyl dithiocarbamate (4.8 parts) is stirred with concentrated hydrochloric acid (4.1 parts by volume). The temperature of the resulting vigorous reaction is held at 25° C.–50° C., by intermittent cooling in ice. A red solution is obtained in about one hour; after 1.5 hours, the reaction solution is poured into acetone (475 parts by volume). The flask is kept at −15° C. for 16 hours; then a precipitate of 2-imino-4-methylene-5-methyl-1,3-dithiolane hydrochloride, having a melting point equal to 127.5° C.—130° C. (prior sintering), is collected in a yield equal to 84%.

The structure of the product is determined by its infrared and nuclear magnetic resonance spectra.

Repeated recrystallization from methanol-ether solution gives the analytical sample, melting point 129° C.–139° C.

Analysis.—Calcd. for $C_5H_8NS_2Cl$. Calcd.: C, 33.05; H, 4.44; N, 7.71; S, 35.29; Cl, 19.51. Found: C, 32.97; H, 4.56; N, 7.51; S, 34.96; Cl, 19.70.

A solution of 2-imino-4-methylene-5-methyl-1,3-dithiolane hydrochloride (4.0 parts) in concentrated hydrochloric acid (9.0 parts, by volume) contained in a suitable flask fitted with thermometer and reflux condenser is heated at ca. 90° C. for two and a half hours. Resultant warm brown reaction solution is then poured into acetone (475 parts, by volume) to yield a solution from which the product crystallizes. The flask is cooled to −15° C. and 3.1 parts (77.5%) of off-white 2-imino-4,5-dimethyl-1,3-dithiole hydrochloride, decomposition range 205° C.–208° C. (prior darkening). The dithiole structure is evidenced by the infrared spectrum and nuclear magnetic resonance spectrum.

Recrystallization from methanol-ether solution without heating yields the analytical sample, decomposition range 201° C.–206° C. (prior darkening).

*Analysis.*—Calcd. for $C_5H_8NS_2Cl$. Calcd.: C, 33.05; H, 4.44; N, 7.71; S. 35.29; Cl, 19.51. Found: C, 32.87; H, 4.41; N, 7.53; S, 35.04; Cl, 19.80.

EXAMPLE 4

Preparation of 2-imino-4-butyl-1,3-dithiole hydrochloride 2-hexynyl dithiocarbamate (19.1 parts) is stirred with concentrated hydrochloric acid (14.0 parts, by volume) and the ensuing reaction is moderated by occasional cooling, which limits the temperature rise to 35° C. After 20 minutes, the heterogeneous reaction mixture is mixed with absolute alcohol (6.5 parts, by volume) to increase solution of the organic phase. When an exotherm is no longer apparent, the still-heterogeneous reaction mixture is dissolved in acetone; and the solution is concentrated in a rotary evaporator to leave a residue which is dissolved in absolute ethanol (100 parts, by volume).

Concentration of the ethanolic solution in a rotary evaporator leaves a gummy residue which is triturated with benzene (450 parts, by volume) to effect solidification. The white solid product, 2-imino-4-butylidene-1,3-dithiolane hydrochloride, recovered as an 89% yield, melts at a temperature of from 122° C. to 127° C.

The structure of the product is determined from its infrared and nuclear magnetic resonance spectra.

Recrystallization from methanol-ether solution at temperatures below 25° C. gives the analytical sample, melting point 127° C.–130° C. (prior sintering).

*Analysis.*—Calcd. for $C_7H_{12}NS_2Cl$. Calcd.: C, 40.08; H, 5.77; N, 6.68; S, 30.57; Cl, 16.90. Found: C, 40.20; H, 5.68; N, 6.71; S, 30.39; Cl, 17.02.

A solution of resultant 2-imino-4-butylidene-1,3-dithiolane hydrochloride (13.0 parts) in concentrated hydrochloric acid (25 parts, by volume) contained in a flask fitted with reflux condenser and thermometer is heated at 85° C.–90° C. for eight hours. Then the brown turbid solution is concentrated in a rotary evaporator to leave a residue which is dried by the twice-repeated vacuum concentration of absolute alcoholic solutions.

The residue is triturated with acetone and the resulting crystalline solid is filtered off. Repeated recrystallization from ethanol-acetone-ether, ethanol-ether, 2-propanol, and methanol-ether solutions yields pure 2-imino-4-butyl-1,3-dithiole hydrochloride, melting point 117° C.–123.5° C., as shown by its infrared and nuclear magnetic resonance spectra, and elemental analysis.

*Analysis.*—Calcd. for $C_7H_{12}NS_2Cl$. Calcd.: C, 40.08; H, 5.77; N, 6.68; S, 30.57; Cl, 16.90. Found: C, 40.13; H, 5.85; N, 6.53; S, 30.66; Cl, 17.11.

EXAMPLE 5

Preparation of 2-imino-4-methyl-5-phenyl-1,3-dithiole hydrochloride

A mixture of 1-phenyl-2-propynyl dithiocarbamate (12.0 parts), concentrated hydrochloric acid (7.5 parts by volume) and absolute ethanol (7 parts by volume) is stirred and the temperature of the ensuing reaction is maintained at a temperature between 28° C. and 38° C. After about two hours, the exotherm is completed; and the reaction mixture, which has become a moist solid, is mixed with 95% ethanol (50 parts by volume) and a little acetone; and 9.7 parts of the white, insoluble product, 2-imino-4-methylene-5-phenyl-1,3-dithiolane hydrochloride, is filtered off from the cooled mixture. Another 1.9 parts of the product is obtained by precipitating it with benzene from an alcoholic solution of the residue from the concentrated mother liquor.

The yield of product, decomposition point 184° C. (prior darkening), is 11.6 parts (82%). The structure of the product is determined from its infrared and nuclear magnetic resonance spectra.

Two recrystallizations from methanol-ether solution at 25° C. and below yield the analytical sample which decomposes at 179° C.–184.5° C. (prior darkening).

*Analysis.*—Calcd. for $C_{10}H_{10}NS_2Cl$. Calcd.: C, 49.26; H, 4.14; N, 5.75; S, 26.31; Cl, 14.54. Found: C, 49.10; H, 4.14; N, 5.71; S, 26.36; Cl, 14.73.

A mixture of 2-imino-4-methylene-5-phenyl-1,3-dithiolane hydrochloride (8.0 parts), concentrated hydrochloric acid (13.7 parts, by volume) and absolute ethanol (10 parts, by volume) contained in a flask fitted with thermometer and reflux condenser is heated at 88° C.–92° C. for three hours. The reaction mixture is then concentrated in vacuo to near-dryness and the residue is taken up in a mixture of ethanol and benzene. Concentration of this solution in vacuo leaves a residue which is triturated with benzene to yield 3.5 parts of an off-white solid. The latter solid is heated at 85° C.–92° C., with concentrated hydrochloric acid (10 parts, by volume) for 4.8 hours. Addition of acetone to the cooled reaction mixture precipitates the product, which is filtered off from the cold (−15° C.) mixture. The yield of 2-imino-4-methyl-5-phenyl-1,3-dithiole hydrochloride, decomposition point 192° C. is 2.2 parts equivalent to 28%. The structure is determined by the infrared and nuclear magnetic resonance spectra.

A portion of the so-obtained dithiole hydrochloride is precipitated from methanol solution by slow addition of ether, and then recrystallized from 2-propanol-methanol-ether solution (at temperatures below 25° C.) to yield material decomposing at 191° C.–198° C. Recrystallization from methanol-ether solution yields substantially pure product, decomposing within the range between 190.5° C.–199° C.

*Analysis.*—Calcd. for $C_{10}H_{10}NS_2Cl$. Calcd.: C, 49.26; H, 4.14; N, 5.75; S, 26.31; Cl, 14.54. Found: C, 49.07; H, 4.11; N, 5.57; S, 25.76; Cl, 14.99.

In each of the above examples the prepared dithiole acid addition salt may, if desired, be converted to the free iminodithiole by neutralizing the said salt with a suitable base, such as sodium hydroxide or potassium hydroxide.

I claim:

1. A method of effecting the cyclization of substituted 2-propynyl dithiocarbamates to obtain ring-substituted iminodithiole salts which comprises the steps of: reacting in a first stage at a temperature of from about 20° C. to about 50° C. a substituted 2-propynyl dithiocarbamate compound of the structure:

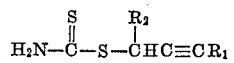

wherein $R_1$ is selected from the group consisting of hydrogen and (lower)alkyl, and $R_2$ is selected from the group consisting of hydrogen, (lower)alkyl and phenyl, with a non-oxidizing strong acid in substantially equimolar amounts; further reacting in a second stage at a temperature of from about 80° C. to about 100° C. resultant product with at least one mole of non-oxidizing strong acid and, thereafter, recovering a ring-substituted compound of the structure:

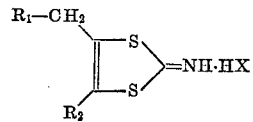

wherein $R_1$ and $R_2$ are the same as described above, and where HX is a non-oxidizing strong acid.

2. A method according to claim 1 wherein $R_1$ and $R_2$ are both hydrogen.

3. A method according to claim 1 wherein $R_1$ is hydrogen and $R_2$ is methyl.

4. A method according to claim 1 wherein $R_1$ is n-propyl and $R_2$ is hydrogen.

5. A method according to claim 1 wherein $R_1$ is hydrogen and $R_2$ is phenyl.

6. A method according to claim 1 wherein the non-oxidizing strong acid is hydrochloric acid.

7. A method according to claim 1 wherein the non-oxidizing strong acid is sulfuric acid.

8. A method according to 1 wherein $R_1$ and $R_2$ are both hydrogen, the non-oxidizing strong acid of the first reaction stage is hydrochloric acid, the reaction temperature of the first reaction stage is 20° C.–50° C. and the mole ratio of acid to substituted 2-propynyl dithiocarbamate is 1.5 for the first reaction stage, and wherein the non-oxidizing strong acid in the second stage is hydrochloric acid, the reaction temperature during the latter stage is maintained at from 80° C. to 100° C.

References Cited

UNITED STATES PATENTS 3,389,148  6/1968  Lies _____ 260—327

JAMES A. PATTEN, *Primary Examiner.*

U.S. Cl. X.R.

260—455; 424—277